Dec. 13, 1955  A. RADICE  2,727,164
ELECTRIC INDUCTION MOTOR, WITH TOTALLY
ENCLOSED, LIQUID-PROOF STATOR
Filed Sept. 10, 1952  2 Sheets-Sheet 1

INVENTOR:
Ambrogio Radice
BY:
Michael S. Striker
agt.

United States Patent Office 2,727,164
Patented Dec. 13, 1955

2,727,164

ELECTRIC INDUCTION MOTOR, WITH TOTALLY ENCLOSED, LIQUID-PROOF STATOR

Ambrogio Radice, Milan, Italy

Application September 10, 1952, Serial No. 308,863

6 Claims. (Cl. 310—86)

The present invention relates to electric induction motors and more particularly to electric induction motors with totally enclosed liquid-proof stators.

The present invention is a continuation-in-part of the copending application Serial Number 1,755, filed January 12, 1948, now Patent 2,615,068, for "Electric Induction Motor, With Totally Enclosed, Liquid-Proof Stator."

It is an object of the present invention to provide a stator which can be easily dismantled, e. g. for checking or repairing the winding thereof.

It is another object of the present invention to provide a stator which is designed in such a manner that any infiltration of the liquid into the space containing the winding is positively prevented.

It is a further object of the present invention to provide a stator which is so designed that the passage of the magnetic flux of the rotor is facilitated; thus minimizing the losses of the flux along the circumference of the gap provided between stator and the rotor.

A stator according to the present invention comprises in combination, two coaxial annular end members arranged spaced from each other in axial direction and each having annular face portions, a tubular outer stator jacket water-tightly secured at its opposite ends to the annular face portions of the annular end members, a tubular inner thin-walled member having a smaller diameter than the tubular outer stator jacket and arranged within the same secured at its opposite ends to the inner annular face portions of the annular end members so that the same form together with the tubular outer stator jacket and the tubular inner thin-walled member a water-tightly enclosed annular space, an annular slotted magnetic core arranged in the water-tightly enclosed annular space, and a stator winding arranged in the water-tightly enclosed space and passing through the slots in the annular magnetic core, the inner thin-walled member, the core and the two annular members forming a detachable unit.

A stator according to the present invention is also characterized by the following limitations: two coaxial annular end members arranged spaced from each other in axial direction and each having annular face portions, an annular slotted magnetic core composed of superimposed laminations and arranged between the annular end members coaxially with the same and with opposite outer laminations abutting against the end members, a tubular inner thin-walled member arranged within the annular magnetic core and located between the annular end members with the outer faces of its end portions abutting against the face portions of the annular end members, one of the end portions of the tubular inner thin-walled member being secured firmly to one of the end members, means mounted on the other annular end member for forcing the other end toward the one end member so as to firmly hold the laminations of the annular slotted magnet between the end members and simultaneously water-tightly connect the end members by the tubular inner thin-walled member, and a tubular outer wall jacket water-tightly secured at its opposite ends to the face portions of the annular end members so as to water-tightly enclose the annular slotted magnetic core in the water-tight annular space formed by itself, the end members and the inner tubular thin-walled member.

Preferably the coaxial annular end members have each an inner annular face portion and an outer annular face portion, the tubular outer stator jacket being water-tightly secured at its opposite ends to the outer annular face portion of the annular end members whereas the tubular inner thin-walled member is secured to the inner annular face portions of the annular end members and the slotted magnetic core has its inner face in contact with the outer face of the tubular inner thin-walled member.

According to a preferred embodiment of the present invention, the tubular inner thin-walled member is provided with a first end flange and a second end flange, the first flange being secured firmly to a shoulder of one of said annular members whereas the second end flange is held between a shoulder of the other end portion and a flange portion of an annular sleeve abutting with the middle part thereof against the other end member, means being mounted on the other end member for pulling the annular sleeve outwardly so that the second flange of the tubular inner thin-walled member is firmly held in position between the flange portion of the sleeve and the shoulder of the other of the annular end members.

Preferably, a packing is inserted between the flange portion of the sleeve and the second flange of the other end portion of the tubular inner thin-walled member, said packing being compressed when said sleeve is pulled outwardly.

Preferably, screw means for cooperation with an externally threaded end portion of the sleeve form the means for pulling the sleeve outwardly.

In a preferred embodiment of the present invention a plurality of recesses is arranged in the annular slotted magnetic core, respectively, in alignment with the slots thereof, the recesses being closed by the tubular inner thin-walled member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
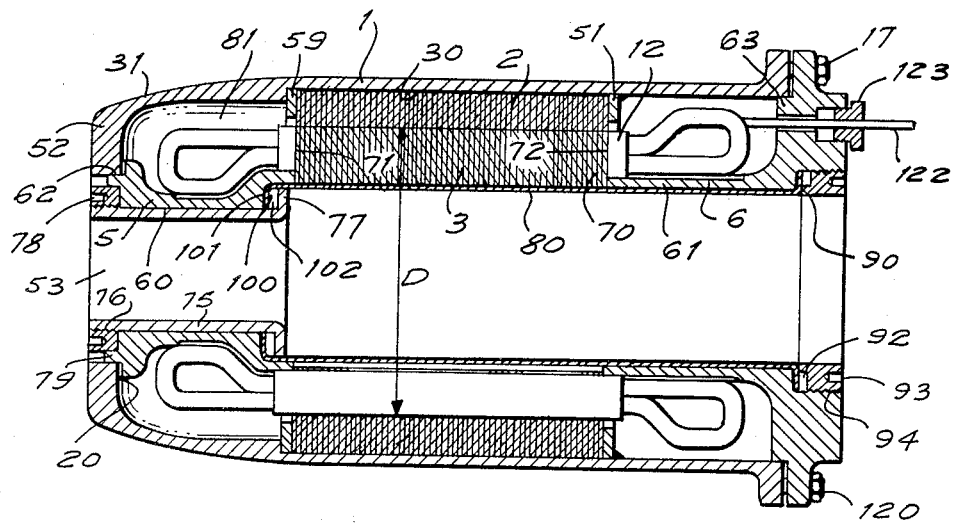
Fig. 1 is a longitudinal section of the stator of an induction motor according to the present invention.
Figure 2:
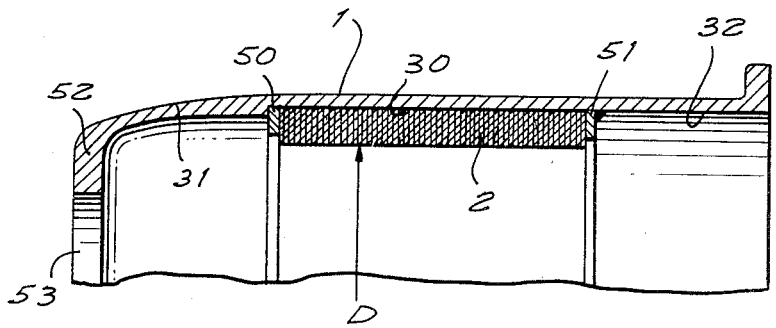
Fig. 2 is a longitudinal section of the outer part or jacket of the stator shown in Fig. 1.

Referring now to the drawings and first to Figs. 1 and 2, a first annular laminated magnetic core 2 is fitted to the inside of the frame 1 which forms the outer protection of the stator winding 12, the magnetic core 2 being secured to the frame 1 by means of transverse annular plates 50 and 51. This unit forms the outer jacket of the stator and has a cylindrical mid portion 30 and two end portions 31 and 32. The end portion 32 is cylindrical and has substantially the same diameter as the cylindrical mid portion 30. The other end portion 31 is tapered and provided with a transverse end wall portion 52 having a central aperture 53.

Figure 4:
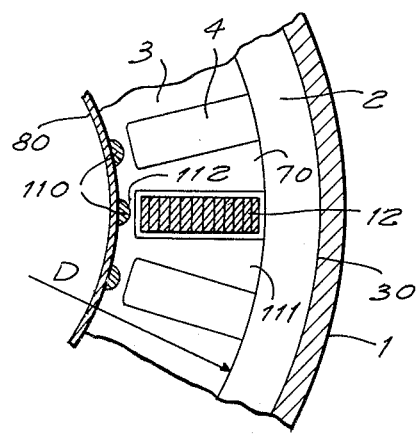
Fig. 4 is a cross-section taken along the line IV—IV of Fig. 1.
Figure 3:
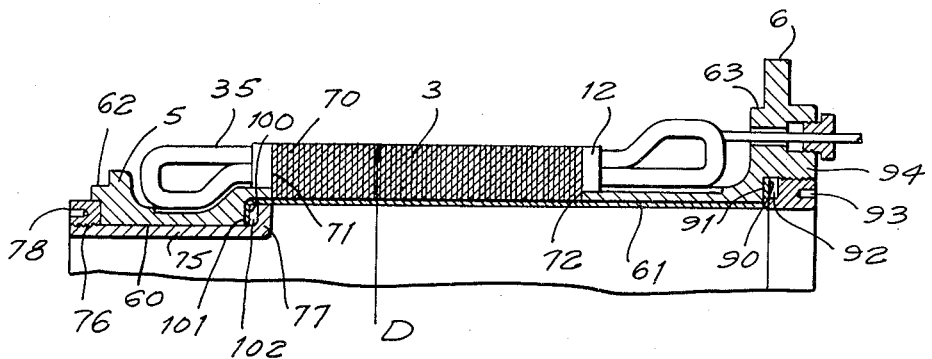
Fig. 3 is a longitudinal section of the inner part or jacket of the stator shown in Fig. 1.

As shown in Figs. 1 and 3, the inner jacket of the stator includes a second annular magnetic core 3, which is provided with axial grooves 4 (Fig. 4) on the outer perimeter thereof and two coaxial annular end members 5 and 6 arranged spaced from each other in axial direction of the stator and each having an inner annular face portion 60 and 61 and an outer annular face portion 62 and 63, respectively. The outer jacket is watertightly secured at its opposite ends to the outer annular face portion 62 and 63 of the annular end members 5 and 6. The slotted magnetic core 3 is composed of laminations 70 which are arranged between the annular end members 5 and 6 coaxially with the same, opposite outer laminations 71 and 72 abutting, respectively, against the end members 5 and 6.

An annular sleeve 75 abuts with the middle part thereof against the end member 5 and has an externally threaded end portion 76 and a flange portion 77 arranged at the other end of the sleeve 75 and extending outwardly therefrom. Screw means 78 cooperate with the externally threaded end portion 76 of the sleeve 75 so as to pull the sleeve 75 outwardly for a reason to be more fully explained hereinafter. The sleeve 5 has an extension 79 projecting between the transverse end wall portion 52 and the screw means 78, the outer annular face portion 62 being the lateral face of the extension 79.

A tubular inner thin-walled member 80 having a smaller diameter than the tubular outer stator jacket shown in Fig. 2 is arranged within the same and secured at its opposite ends to the annular face portions of the annular end members 5 and 6 in the manner to be described more in detail hereinafter. Thus, the tubular inner thin-walled member 80 forms together with the tubular outer stator jacket and the annular end members 5 and 6 an annular space 81 which is watertightly enclosed by the means to be more fully described hereinafter, the slotted magnetic core 3 being arranged in the annular space 81.

The tubular inner thin-walled member 80 has at one of its ends a flange 90 turned outwardly, termed hereinafter the first flange which is firmly secured to a shoulder 91 of the end member 6 by means of a packing 92 and a screw 93 screwed into the threaded end portion 94 of the annular end member 6.

The other end of the tubular inner thin-walled member 80 is formed with an inwardly turned flange 100 termed hereinafter the second flange which abuts against the shoulder 101 of the end member 5. A packing 102 is inserted between the flange portion 77 and the second flange 100 of the tubular inner thin-walled member 80.

The tubular inner thin-walled member 80 consists preferably of a thin sheet of non-magnetic material such as Ni-Cr steel.

The laminations 70 are provided with recesses 110 arranged, respectively, in alignment with the slots 4 and being closed by the tubular inner thin-walled member 80. The recesses 110 leave in each lamination 70 tooth-like parts 111 between the slots 4 which are joined with one another by bridges 112 of material. This arrangement has been designed in order to prevent any leakage of the magnetic flux of the stator along the circumference of the gap between the stator and the rotor (not shown) which is contiguous to the tubular inner thin-walled member 80.

The frame 1 of the outer jacket is connected to the end member 6 by screw bolts 120. The end member 6 is traversed by borings 121 for accommodating the leads 122 of the winding 12 which are led through gaskets 123.

The operation of this device is substantially the same as that of the submersible electric motor described in the copending application, Serial Number 1,755, mentioned hereinabove from which the motor according to the present invention differs by the structural limitations set forth in detail hereinabove.

In assembling the inner jacket of the stator the tubular inner thin-walled member 80 is put into position so that the flange 90 thereof abuts against the shoulder 91 of the end member 6. Then the packing 92 is put into position and the screw 93 is tightened so that the flange 90 of the tubular inner thin-walled member 80 is firmly secured to the end member 6. In order to render the annular space 81 liquid-tight the other end of the tubular inner thin-walled member 80 formed by the inwardly turned flange 100 is secured to the end member 5 by screwing the screw 78 to the sleeve 75 so that the sleeve 75 is moved outwardly in axial direction and the flange portion 77 thereof compresses the packing 102 which in turn seals the flange 100 of the tubular inner thin-walled member 80 to the shoulder 101 of the end member 5.

Thus it will be seen that a stator according to the invention is absolutely liquid-tight and protects the winding 12 from contact with the liquid. Nevertheless the stator can be easily dismantled in case of a fault in the winding or the like for which it is only needed to remove the screws 120.

The tubular inner thin-walled member 80 can be easily withdrawn and replaced by unscrewing the screws 78 and 93. This operation can be carried out without dismantling other parts of the stator.

It will be understood that each of the elements described above, or two or more together, may also find a useful application in other types of electric induction motors differing from the types described above.

While the invention has been illustrated and described as embodied in an electric induction motor with totally enclosed liquid-free stators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A liquid impermeable stator for an electric motor comprising, in combination, two co-axial annular end members arranged spaced from each other in axial direction and each having a first annular face portion and a second annular face portion; a tubular outer stator jacket watertightly engaging at its opposite ends said first annular face portions of said annular end members; a tubular inner thin-walled member having a smaller diameter than said tubular outer stator jacket and arranged within the same engaging at its opposite ends said second annular face portions of said annular end members so that the same form together with said tubular outer stator jacket and said tubular inner thin-walled member a watertightly enclosed annular space; an annular magnetic core arranged in said water-tightly enclosed annular space with its inner face in contact with the outer face of said tubular inner thin-walled member, said core having an outer annular face formed with slots; a stator winding arranged in said water-tightly enclosed space and passing through the slots in said annular magnetic core; first attaching means detachably connecting said tubular inner thin-walled member, said magnetic core, and said two annular end members so that the same form a unit; and second attaching means detachably securing said unit to said outer stator jacket.

2. A liquid impermeable stator for an electric motor comprising, in combination, two co-axial annular end members arranged spaced from each other in axial direction and each having an inner annular face portion and an outer annular face portion; an annular magnetic core composed of superimposed laminations and arranged between said annular end members co-axially with the same and with opposite outer laminations abutting against said end members, said core having an outer annular face formed with slots; a tubular inner thin-walled member arranged within said annular magnetic core and located between said annular end members with its end portions water tightly abutting against said inner annular face portions of said annular end members; means securing one of said end portions of said tubular inner thin-walled members to the corresponding end member; adjustable means mounted on the other annular end member engaging the other end portion of said tubular thin-walled member for forcing said other end member towards said first mentioned end member while tensioning said tubular thin-walled member so as to firmly hold said laminations of the annular slotted magnetic core between said end members and simultaneously water-tightly connect said end members by said tubular inner thin-walled member whereby a detachable unit is formed; and a tubular outer jacket water-tightly engaging at its opposite ends said outer annular face portions of said annular end members so as to water-tightly enclose said annular slotted magnetic core in the water-tight annular space formed by itself, said end members and said inner tubular thin-walled member; and attaching means detachably attaching said unit to said outer jacket.

3. A liquid impermeable stator for an electric motor comprising, in combination, two co-axial annular end members arranged spaced from each other in axial direction and each having an inner annular face portion and an outer annular face portion; an annular magnetic core composed of superimposed laminations and arranged between said annular end members co-axially with the same and with opposite outer laminations abutting against said end members, said core having an outer annular face formed with slots; a tubular inner thin-walled member arranged within said annular magnetic core and located between said annular end members, said tubular inner thin-walled member having two end portions, the outer face of one of said end portions of said tubular inner thin-walled member abutting against said inner annular face of one of said annular end members and having a first flange secured firmly to a shoulder thereof, the outer face of the other of said end portions of said tubular inner thin-walled member abutting against said inner annular face of the other of said annular end members; an annular sleeve abutting with the middle part thereof against said other end member and having a flanged portion extending outwardly from said sleeve; a second flange forming part of said other end portion of said tubular inner thin-walled member and being held between a shoulder of said other end portion and said flange portion of said annular sleeve; means mounted on said other end member for pulling said annular sleeve outwardly so that said second flange of said tubular inner thin-walled member is firmly held in position between said flange portion of said sleeve and said shoulder of said other of said annular end members, said other end member being forced toward said one end member so as to firmly hold the laminae of the annular slotted magnetic core between said end members and simultaneously to tension said thin-walled tubular member and to water-tightly connect said end members by said tubular inner thin-walled member whereby a detachable unit is formed; and a tubular outer jacket water-tightly engaging at its opposite ends said outer annular face portions of said annular end members so as to water-tightly enclose said annular slotted magnetic core in the water-tight annular space formed by itself, said end members and said inner tubular thin-walled member; and attaching means detachably attaching said unit to said outer jacket.

4. A liquid impermeable stator for an electric motor comprising, in combination, two co-axial annular end members arranged spaced from each other in axial direction and each having an inner annular face portion and an outer annular face portion; an annular magnetic core composed of superimposed laminations and arranged between said annular end members co-axially with the same and with opposite outer laminations abutting against said end members, said core having an outer annular face formed with slots; a tubular inner thin-walled member arranged within said annular magnetic core and located between said annular end members, said tubular inner thin-walled member having two end portions, the outer face of one of said end portions of said tubular inner thin-walled member abutting against said inner annular face of one of said annular end members and having a first flange abutting against a shoulder of said one end member; a screw screwed into an internally threaded portion of said one end member and pressing against said first flange so as to firmly secure the same; the outer face of the other of said end portions of said tubular inner thin-walled member abutting against said inner annular face of the other of said annular end members; an annular sleeve abutting with the middle part thereof against said other end member and having an externally threaded end portion and a flanged portion arranged at the other end of said sleeve and extending outwardly from said sleeve; a second flange forming part of said other end portion of said tubular inner thin-walled member and being held between a shoulder of said other end portion and said flange portion of said annular sleeve; screw means for cooperation with said externally threaded end portion of said sleeve mounted on said other end member for pulling said annular sleeve outwardly so that said second flange of said tubular inner thin-walled member is firmly held in position between said flange portion of said sleeve and said shoulder of said other of said annular end members, said other end member being forced toward said one end member so as to firmly hold the laminae of the annular slotted magnetic core between said end members and simultaneously to tension said thin-walled tubular member and to water-tightly connect said end members by said tubular inner thin-walled member whereby a detachable unit is formed; and a tubular outer jacket water-tightly engaging at its opposite ends said outer annular face portions of said annular end members so as to water-tightly enclose said annular slotted magnetic core in the water-tight annular space formed by itself, said end members and said inner tubular thin-walled member; and attaching means detachably attaching said unit to said outer jacket.

5. A liquid impermeable stator for an electric motor comprising, in combination, two co-axial annular end members arranged spaced from each other in axial direction and each having an inner annular face portion and an outer annular face portion; an annular magnetic core composed of superimposed laminations and arranged between said annular end members co-axially with the same and with opposite outer laminations abutting against said end members, said core having an outer annular face formed with slots; a tubular inner thin-walled member arranged within said annular magnetic core and located between said annular end members with its end portions water tightly abutting against said inner annular face portions of said annular end members; means securing one of said end portions of said tubular inner thin-walled members to the corresponding end member; means adjustably mounted on the other annular end member engaging the other end portion of said tubular thin-walled member for forcing said other end member towards said first mentioned end member while tensioning said tubular thin-walled member so as to firmly hold said laminations of the annular slotted magnetic core between said end members and simultaneously water-tightly connect said end members by said tubular inner thin-walled member whereby a detachable unit is formed; a tubular outer jacket water-tightly engaging at its opposite ends said outer annular face portions of said annular end members so as to water-tightly enclose said annular slotted magnetic core in the water-tight annular space formed by itself, said end members and said inner tubular thin-walled member attaching means detachably attaching said unit to said outer jacket; said annular slotted magnetic core having an inner cylindrical face engaging the outer face of said thin-walled tubular member and being formed with a plurality of recesses closed by said tubular inner thin-walled member.

6. A liquid impermeable stator for an electric motor, comprising, in combination, two coaxial annular end members arranged spaced from each other in axial direction; a tubular outer stator jacket water-tightly engaging at its opposite ends said annular end members; a tubular inner thin-walled member having a smaller diameter than said outer stator jacket and arranged within the same water-tightly engaging at its opposite ends said annular end members so that said end members, said tubular outer stator jacket, and said tubular inner thin-walled member form a water-tightly enclosed annular space; an annular laminated magnetic core arranged in said annular space and having an inner face engaging the outer face of said tubular inner thin-walled member, an outer annular face formed with slots, and end faces engaging, respectively, said end members; a stator winding at least partly arranged in said slots in said magnetic core; means securing one end of said thin-walled tubular member to one of said end members; and tensioning means engaging the other end of said thin-walled tubular member and the other end member for moving said other end member relative to said thin-walled tubular member toward said one end member whereby said laminated magnetic core is compresed and said thin-walled tubular member is tensioned and a detachable unit is formed of said end members, said core, said stator winding, said thin-walled tubular member, and said tensioning means.

References Cited in the file of this patent

UNITED STATES PATENTS 2,463,936   Allison _____ Mar. 8, 1949